(12) United States Patent
Pourhabibi Zarandi et al.

(10) Patent No.: US 11,748,254 B2
(45) Date of Patent: Sep. 5, 2023

(54) DATA TRANSFORMER APPARATUS

(71) Applicant: Ecole Polytechnique Federale de Lausanne (EPFL), Lausanne (CH)

(72) Inventors: Arash Pourhabibi Zarandi, St-Sulpice VD (CH); Siddharth Gupta, St-Sulpice VD (CH); Hussein Kassir, Echandens-Denges (CH); Mark Sutherland, Lausanne (CH); Zilu Tian, Ecublens VD (CH); Mario Paulo Drumond Lages De Oliveira, St-Sulpice VD (CH); Babak Falsafi, Chexbres (CH); Christoph Koch, Blonay (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 17/638,825

(22) PCT Filed: Aug. 27, 2019

(86) PCT No.: PCT/EP2019/072783
§ 371 (c)(1),
(2) Date: Feb. 27, 2022

(87) PCT Pub. No.: WO2021/037341
PCT Pub. Date: Mar. 4, 2021

(65) Prior Publication Data
US 2022/0327048 A1 Oct. 13, 2022

(51) Int. Cl.
*G06F 12/00* (2006.01)
*G06F 12/02* (2006.01)
(Continued)

(52) U.S. Cl.
CPC ........ *G06F 12/0238* (2013.01); *G06F 9/3004* (2013.01); *G06F 9/30101* (2013.01); *G06F 12/1027* (2013.01); *G06F 2212/7201* (2013.01)

(58) Field of Classification Search
CPC ............ G06F 12/0238; G06F 12/1027; G06F 9/3004; G06F 9/30101; G06F 2212/7201
See application file for complete search history.

(56) References Cited

U.S. PATENT DOCUMENTS

| 10,198,349 | B2 | 2/2019 | Breternitz et al. |
| 2018/0095760 | A1* | 4/2018 | Guilford ............... G06F 9/3001 |

OTHER PUBLICATIONS

International Preliminary Report on Patentability dated Mar. 1, 2022 From the International Bureau of WIPO Re. Application No. PCT/EP2019/072783. (13 Pages).
(Continued)

*Primary Examiner* — Shawn X Gu

(57) ABSTRACT

Data transformer apparatus comprising a dispatcher module, a reader module, a converter module and a writer module; the dispatcher module is configured to receive a data transformation request including a first and a second information items; the reader module is configured to retrieve data to be transformed, according to said first information item; obtain the type attribute of the data to be transformed, based on said first information item; send the data to be transformed and the type attribute to the converter module; the converter module is configured to select transformation instructions based on said type attribute; execute, on the data to be transformed, the selected transformation instructions, thereby obtaining transformed data; send the transformed data to the writer module; the writer module is configured to; write the transformed data in an output buffer according to said second information item.

22 Claims, 3 Drawing Sheets

(51) Int. Cl.
*G06F 9/30* (2018.01)
*G06F 12/1027* (2016.01)

(56) References Cited

OTHER PUBLICATIONS

International Search Report and the Written Opinion dated May 29, 2020 From the International Searching Authority Re. Application No. PCT/EP2019/072783. (17 Pages).

Slee et al. "Thrift: Scalable Cross-Language Services Implementation", Facebook White Paper, XP055692124, 5(8): 127-1-127-8, Apr. 1, 2007.

Web Archive "Language Guide (Proto3)—Protocol Buffers—Google Developers", Retrieved From the Internet on Web Archive, XP055692573, p. 1-30, Jul. 26, 2019.

* cited by examiner

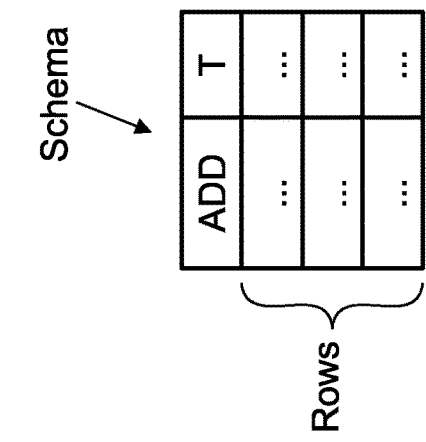
FIG. 2
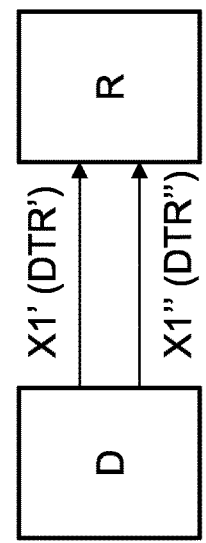
FIG. 2a
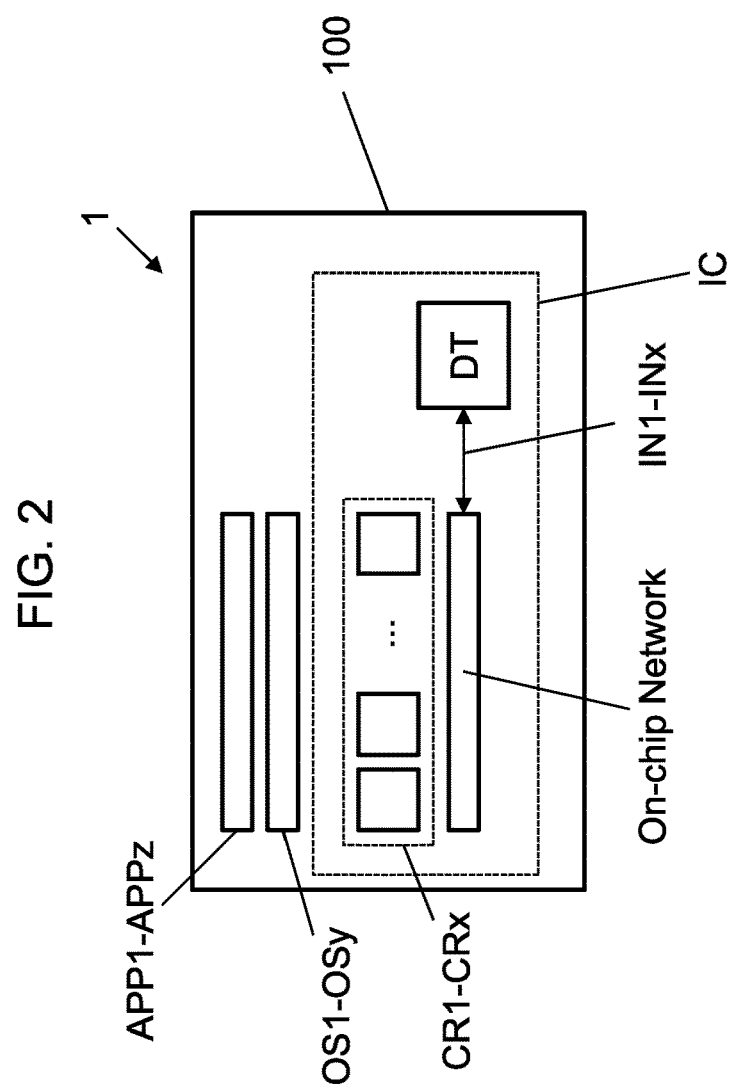
FIG. 4
FIG. 5

DATA TRANSFORMER APPARATUS

RELATED APPLICATIONS

This application is a National Phase of PCT Patent Application No. PCT/EP2019/072783 having International filing date of Aug. 27, 2019, the contents of which are incorporated herein by reference in their entirety.

FIELD AND BACKGROUND OF THE INVENTION

The present invention refers to a data transformer apparatus.

The present invention also refers to a data processing system, including said data transformer apparatus.

As known, microservices are independent software modules that communicate using strictly enforced APIs, often in the form of RPCs (Remote Procedure Calls). Although state-of-the-art RPC stacks boast latencies near those offered by hardware terminated protocols (RDMA), microservices complicate the process by adding another layer to the software stack—a data transformation layer which converts the RPCs' arguments and return values to and from the data formats used by the software endpoints.

As each microservice is bespoke, it is common for it to be written in the programming language best suited to its specific purpose, and use the data format most natural to that language. Therefore, RPCs fundamentally rely on Data Transformation, to convert the data back and forth between the formats used by the application endpoints; even applications using the same data formats need to flatten objects before passing them to the network stack.

Current Data Transformation solutions are performed exclusively in software, due to the generality required by various data formats. In theory, enforcing a single data format would enable all applications to communicate at network speeds without the need for Data Transformation. In practice, microservice architectures often opt to add an intermediary framework layer in between each application to ensure compatibility and extensibility. Improving Data Transformation software's performance is difficult because these frameworks generate serial code that is dominated by control-flow and memory movement instructions.

Specialized hardware accelerators are theoretically good candidates to investigate in order to perform these complex transformations in the absence of natural CPU performance scaling. However, justifying the investment in specialized hardware is always difficult, as it must be applicable to a variety of applications to be cost-effective; contexts wherein workloads show significant diversity—such as datacenters, for example—clearly call for a different solution, which today seems not to be available.

In this scenario, the Applicant observes that data transformation is actually a parallel task, which is currently not expressed in the code generated by available data transformation frameworks.

In particular, the Applicant has noted that, since each field of an object is independent from the other fields, the parallelism in data transformation tasks can be properly represented as field-level.

As will be disclosed in detail in the following, in order to exploit these considerations, an in-memory field-based data structure is created by the framework, as the object is being built.

SUMMARY OF THE INVENTION

In view of the above, it is an object of the present invention to provide a data transformer apparatus that achieves complex data transformation tasks at high speed.

Another object of the present invention is providing a data transformer apparatus that is compatible with existing data representations, thus being usable, for example, by all applications deployed on a server.

Another object of the present invention is providing a data transformer apparatus that has a minimal impact on the existing server architecture, reducing deployment costs and complexity.

These and further objects are substantially achieved by a data transformer apparatus according to the appended claims.

BRIEF DESCRIPTION OF THE SEVERAL VIEWS OF THE DRAWINGS

Further features and advantages will appear from the following description, wherein preferred embodiments of the invention are disclosed.

Such description is provided with reference to the annexed non-limiting drawings, in which:

FIG. 2 shows a general environment in which the data transformer apparatus of FIG. 1 can be used;

FIG. 2a shows another environment in which the data transformer apparatus of FIG. 1 can be used;

FIG. 4 schematically shows data used in the data transformer apparatus of FIG. 1;

FIG. 5 schematically represent a functional detail of an embodiment of the data transformer apparatus of FIG. 1;

DESCRIPTION OF SPECIFIC EMBODIMENTS OF THE INVENTION

Figure 1:
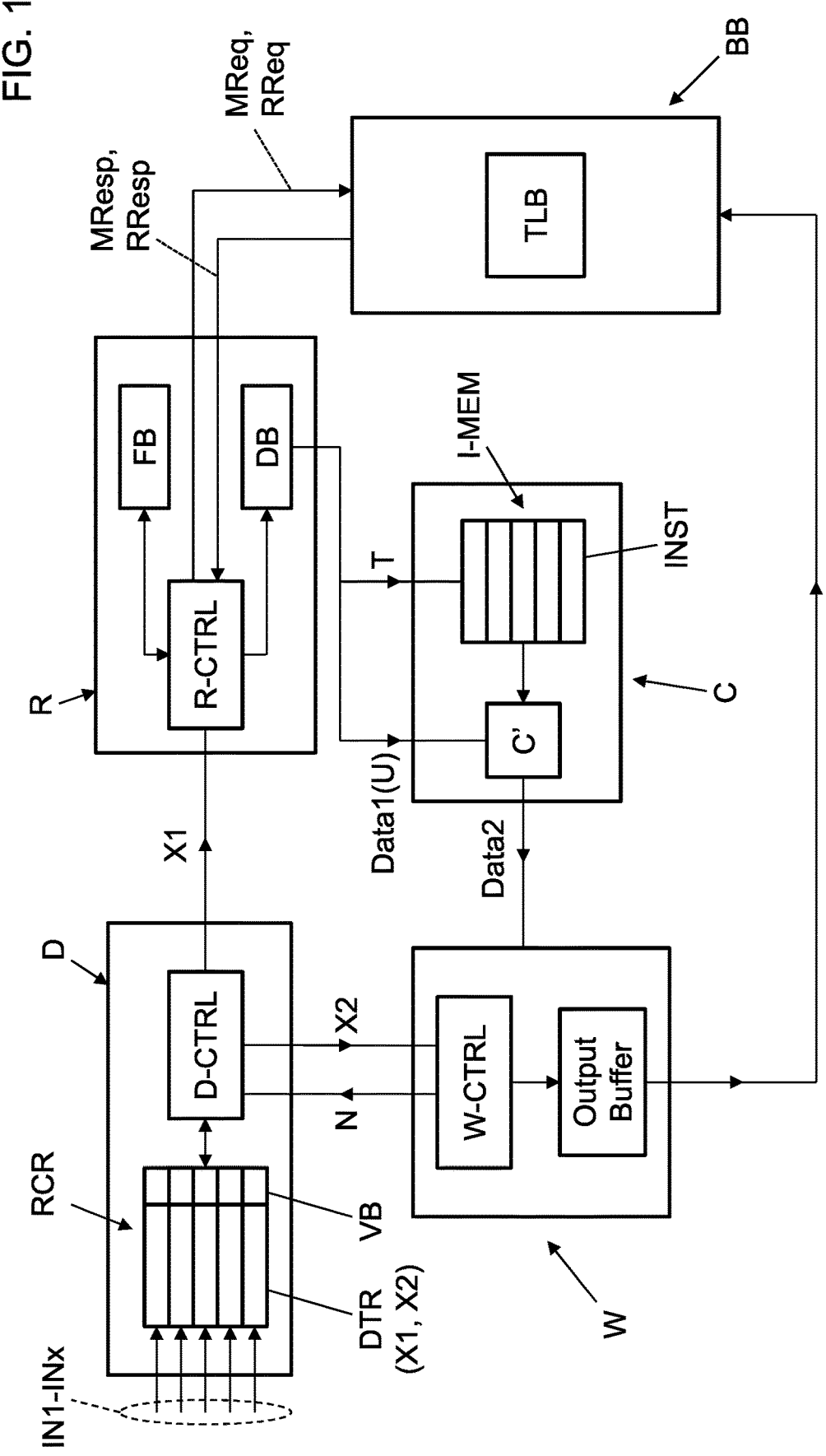
FIG. 1 shows a block diagram of a data transformer apparatus according to the invention.

With reference to the drawings, DT denotes a data transformer apparatus according to the present invention.

In general terms, data transformer apparatus DT operates on data to be transformed Data1 and provides corresponding transformed data Data2. As will be disclosed in the following, data transformer apparatus DT is a programmable hardware data transformer. Data to be transformed Data1 are provided by a software application, e.g. a microservice, and the transformed data Data2 are provided back to said software application.

FIG. 2 shows a schematic diagram representing an environment in which the data transformer apparatus DT is preferably employed.

A server architecture 1 is provided with a data processing system 100. The data processing system 100 is preferably based on an on-chip network technology.

In more details, the data processing system 100 comprises an integrated circuit IC.

The integrated circuit IC includes at least one core CR1. Preferably, the integrated circuit IC includes a plurality of cores CR1-CRx.

Preferably, on ore more operating systems OS1-OSy are installed on cores CR1-CRx Preferably, one or more software applications APP1-APPz run based on said one or more operating systems OS1-OSy.

The Applicant observes that the data transformer apparatus DT can also be used in different scenarios than the one schematically illustrated in FIG. 2. For example, FIG. 2a schematically shows the application of data transformer apparatus DT in a mobile environment. A mobile device 1', such as smartphone, a tablet, a laptop, etc. includes conventional hardware/software resources (a display, long-range and/or short-range communication modules, a user data input device—provided through touch screen capabilities of the display and/or a physical keyboard, etc.), generically denoted at 2. The mobile device 1' further comprises the data transformer apparatus DT according to the invention. Preferably the data transformer apparatus DT is comprised in a data processing system 100' having the same features as the processing system 100 disclosed above. It has to be noted that hardware/software resources 2 and data processing system 100' may, to some extent, overlap; they have been represented as separated blocks merely for the sake of simplicity. The Applicant notes that a mobile environment can benefit from the data transformer apparatus DT, for example, in terms performance per watt efficiency, i.e. in terms of power consumption reduction.

The following description will refer to both the data transformer apparatus DT included in server architecture 1 and the data transformer apparatus DT included in mobile device 1'.

Each software application, e.g. a microservice, can issue a data transformation request DTR, in order to obtain that data to be transformed Data1 are transformed into transformed data Data2.

Preferably, the data to be transformed Data1 include one or more messages.

Preferably, each message includes one or more fields.

For the application APP1-APPz to begin using the data transformer apparatus DT, it requests access to it through the operating system OS1-OSy. The operating system OS1-OSy returns a context to the application APP1-APPz that contains the following elements: i) the address of a memory area where all messages from the application must be constructed, ii) the I/O virtual address where data transformation requests DTR are to be submitted. Preferably, the memory area where all messages from the application must be constructed is a memory arena. Preferably, an arena-based memory management is used.

Preferably, such management follows principles of user-level allocators, such as for example the one known as "jemalloc" (see http://jemalloc(dot)net/, last accessed on Aug. 2, 2019).

The application APP1-APPz can also request the operating system OS1-OSy to program the data transformer apparatus's memory with the transformations it wishes to use. Such memory will be referred to as I-MEM and disclosed in further detail in the following.

The data transformer apparatus DT receives the data transformation request DTR and performs the required transformation.

In more details, data transformer apparatus DT (FIG. 1) comprises at least a dispatcher module D, at least a reader module R, at least a converter module C, and at least a writer module W. The data transformer apparatus DT preferably also comprises at least a block buffer module BB.

Each of the dispatcher module D, reader module R, converter module C, writer module W and block buffer module BB is a hardware module, particularly a specialized hardware module.

Each of the dispatcher module D, reader module R, converter module C, writer module W and block buffer module BB preferably comprises one or more circuits and/or one or more electric/electronic components suitably arranged and/or programmed in order to carry out the operations disclosed herein.

Preferably, a pipeline formed of one reader module R, one converter module C and one writer module W can be referred to as a Transformation Pipeline.

Preferably, the Transformation Pipeline is a Decoupled Access-Execute architecture.

In general terms, more than one reader module R, more than one converter module C and/or more than one writer module W can be included in a Transformation Pipeline. However, in the Applicant's view, it is more convenient and efficient providing a single reader module R, a single converter module C and a single writer module W per Transformation Pipeline.

Figure 6:
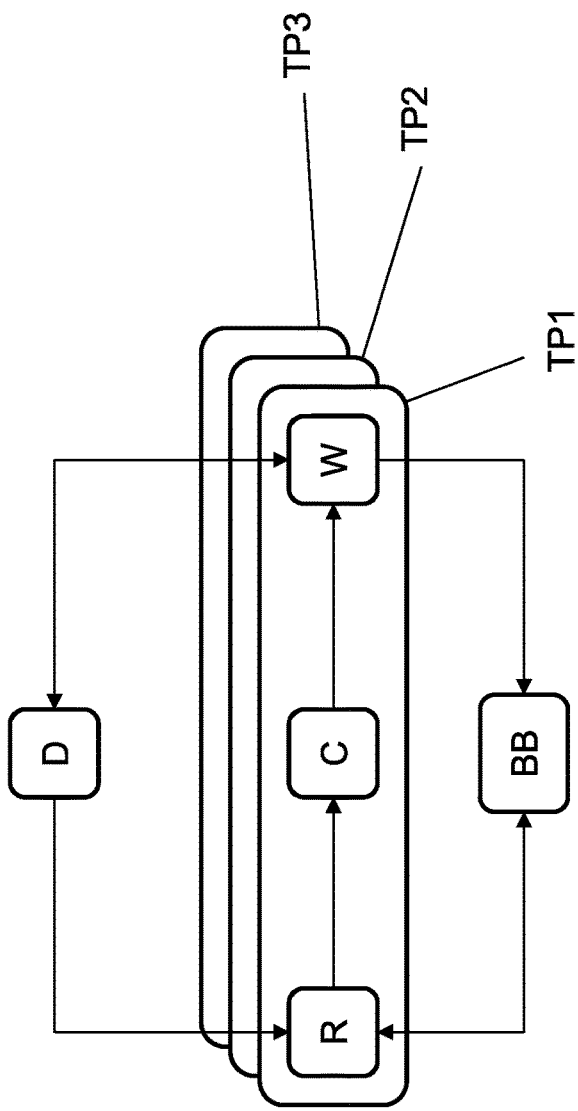
FIG. 6 schematically shows an embodiment of the data transformer apparatus of FIG. 1.

The data transformer apparatus DT can include one or more Transformation Pipelines. By way of example, FIG. 6 shows that the data transformer apparatus DT can include a first Transformation Pipeline TP1, a second Transformation Pipeline TP2 and a third Transformation Pipeline TP3. Preferably each Transformation Pipeline has the same hardware/software features and operates as disclosed in the following.

The dispatcher module D is configured to receive the data transformation request DTR.

The data transformation request DTR includes a first information item X1 and a second information item X2.

The first information item X1 is associated to the memory address ADD where the data to be transformed Data1 are stored. The first information item X1 is also associated to a type attribute T of the data to be transformed Data1. The type attribute T is associated to the data to be transformed Data1 and identifies the transformation to be performed on such data.

The pair formed by the memory address ADD and type attribute T can also be referred to as "schema" (FIG. 4). A schema is thus defined by metadata associated with the data to be transformed Data1 that are provided to the data transformer apparatus DT in order to perform the transformation.

Preferably, a schema is associated to a respective message, which is included in the data to be transformed Data1.

Preferably, a schema is formed by multiple rows, each row being associated to a respective field of the message. Each row includes a memory address ADD and a type attribute T.

Accordingly, the first information item X1 is associated to a respective schema. In other words, the first information item X1 includes information that allows to retrieve the schema associated with the data to be transformed Data1 i.e., for example, to a message to be transformed.

Preferably, the first information item X1 is a pointer pointing to a memory area wherein the schema is stored.

Such memory area contains the memory address ADD and the type attribute T of the data to be transformed Data1. In more details, the memory address ADD indicates where the field to be transformed is stored, and the type attribute T indicates the transformation to be applied to such field.

The first information item X1 and/or the associated schema can be explicitly communicated to the data transformer apparatus DT, and in particular to the dispatcher module D, through the existing virtual memory system, unpacked by its hardware units, and then transformed independently from other data to be transformed.

The schema, i.e. the pair(s) of metadata [memory address ADD, type attribute T] allows to achieve a twofold advantage: first, it enables the hardware to operate on each field in parallel by scanning the schema, accessing the data to be transformed Data1, and performing the requested operations (which, as said, are identified by the type attribute T). Second, it enables the data transformer apparatus DT to be data- and framework-independent; the only required change to the framework is that it updates the schema when constructing the message to be transformed. The task of the each application APP1-APPz is reduced to generating the schema and then providing it to the data transformer apparatus DT.

The second information item X2 is indicative of a memory location where transformed data Data2 have to be written.

Preferably, the dispatcher module D is configured to send the first information item X1 to the reader module R, and to send the second information item X2 to the writer module W.

Preferably, the dispatcher module D comprises one or more dedicated request control registers RCR, adapted to store data transformation requests DTR. Advantageously, each dedicated request control register RCR is associated with a respective core CR1-CRx.

In more general terms, the dispatcher module D has one or more inputs IN1-INx, each associated with a respective of said cores CR1-CRx.

Preferably, the dedicated request control registers RCR are accessed by cores CR1-CRx through memory mapped I/O (MMIO). In more details, the internal registers of the dispatcher module D (i.e. the dedicated control registers RCR) are mapped to I/O virtual addresses (IOVAs) in each process' address space, thereby enabling kernel-bypass and reduce latency.

In view of the above, a dedicated data path for each core CR1-CRx is provided by dedicating a respective I/O virtual address to each request control register RCR.

Preferably, the dispatcher module D comprises a controller D-CTRL, that is configured to read the data transformation requests DTR from the dedicated request control registers RCR. In particular, the controller D-CTRL is configured to poll on the one or more dedicated request control registers RCR to read the data transformation requests DTR placed therein.

Preferably, each of the data transformation requests DTR is associated to a validity bit VB. The validity bit VB indicates whether the data transformation request DTR is active. From a practical point of view, the validity bit has a first value when the data transformation request DTR has been received and the corresponding data transformation is not completed yet; the validity bit has a second value, different from the first value, when the corresponding data transformation request has been completed.

Preferably, the controller D-CTRL is configured to modify the validity bit VB once the corresponding data transformation has been completed, preferably upon notification N from the writer module W.

Preferably, the controller D-CTRL is configured to send the first information item X1 to the reader module R.

Preferably, the controller D-CTRL is configured to send the second information item X2 to the writer module W.

In an embodiment (schematically represented in FIG. 5), the dispatcher module D is configured to send to the reader module R a first information item X1' of a first data transformation request DTR', and then a first information item X1" of a second data transformation request DTR". Preferably, the first information item X1" of the second data transformation request DTR" is sent when the data transformation associated with the first data transformation request DTR' is not completed yet.

This allows time sharing of the reader module R (and of the corresponding Transformation Pipeline) among different data transformation requests DTR provided by the dispatcher module D and originated from the application(s) APP1-APPz.

From a practical point of view, the reader module R can keep multiple message (requests) contexts, wherein each context comprises the schema pointer (i.e. the first information item X1), the current schema field and an index of the current field. Such index indicates the progression of the transformation; it can indicate, for example, the last field for which transformation has been completed, or the field that is currently under transformation. The index is particularly helpful when, for some reasons, transformation is interrupted and has to be resumed after a certain time.

The block buffer module BB contains a mapping between a virtual memory system and a physical memory area. The data to be transformed Data1 are stored in such physical memory area.

Preferably, the block buffer module BB comprises a translation lookaside buffer TLB, having one entry for each core that is allowed to issue data transformation requests DTR, i.e. for each of cores CR1-CRx.

Preferably, each core CR1-CRx is identified by a respective core identifier. Preferably the block buffer module BB (in particular the translation lookaside buffer TLB) is indexed by core identifier.

Preferably, the block buffer module BB is virtually indexed and physically tagged.

Preferably, the block buffer module BB is not coherent with the rest of the on-chip memory hierarchy.

Preferably, if a data request to the block buffer module BB results in a miss, then the block buffer module BB requests data from the on-chip cache coherence protocol.

In practical terms, the block buffer module BB contains the virtual-to-physical translations where the applications APP1-APPz construct their data transformation requests.

Upon initialization of each application APP1-APPz, the operating system OP1-OPy allocates and pins respective storage pages and fills the block buffer module BB (in particular the translation lookaside buffer TLB) with the translations.

Preferably, the translation(s) associated with a certain application APP1-APPz are maintained as long as the same application APP1-APPz is active.

The reader module R is configured to retrieve the data to be transformed Data1, according to the first information item X1 provided by the dispatcher module D preferably through a hardware queue. In particular, the reader module R uses the pointer included in said first information item X1. Preferably, the reader module R is configured to retrieve the data to be transformed Data1 via the block buffer module BB.

In other terms, the reader module R is configured to parse the schema, fetch all the fields accordingly (for example from the server's virtual memory, in case of application of the invention to the environment schematically represented in FIG. 2) and passing them to the converter module C.

Preferably, the reader module R comprises a controller R-CTRL, configured to carry out the operations disclosed herein.

In order to retrieve the data to be transformed Data1, the reader module R is configured to send a memory request MReq to the block buffer module BB, based on the first information item X1.

A memory response MResp is provided by the block buffer module BB; the memory response MResp is representative of the memory address ADD, i.e. a pointer to the memory area where the data to be transformed Data1 are stored. Preferably, the reader module R comprises a field buffer FB, wherein the memory response MResp is stored.

The memory response MResp can include a cache line containing the field(s) corresponding to the memory request MReq.

The reader module R is configured to send a read request RReq to the block buffer module BB, based on the received pointer. In more details, the reader module R preferably extracts a field from the field buffer FB, parses such extracted field so as to obtain an input data pointer; the latter is used for issuing the read request RReq.

If a field is a sub-message, the reader module R recursively fetches the schema out of that sub-message and processes it in a depth-first search manner.

A read response RResp is provided by the block buffer module BB; the read response RResp includes the data to be transformed Data1. In particular, the read response RResp can include a cache line containing the field data.

Preferably, the reader module R comprises a data buffer DB, wherein the read response RResp is stored.

Preferably, the reader module R is configured to select, in the read response RResp, data units U corresponding to the data to be transformed Data1. Such data units U are also referred to as "chunks".

Preferably, the reader module R also calculates the offset where the writer module W will have to place the transformed data Data2 based on the schema field.

The reader module R is configured to obtain the type attribute T of the data to be transformed Data1 based on said first information item X1.

In an embodiment, the reader module R is configured to send to the block buffer module BB a plurality of read requests RReq based on the received pointer.

In other terms, once the schema is resident in the field buffer FB, multiple data elements can be prefetched in parallel, reducing the waiting time as the reader module R forms the chunks and sends them to the converter module C. Preferably, the reader module R has dedicated prefetching logic which can operate in parallel with the logic that forms the chunks.

The data to be transformed Data1, the type attribute T thereof and the calculated offset are then sent from the reader module R to the converter module C.

The converter module C is configured to select one or more transformation instructions INST based on the type attribute T provided by the reader module R.

Preferably, the converter module C comprises an instruction memory I-MEM, which stores a sequence of instructions for each application-defined type to perform the transformation.

For certain data types (e.g. "varint"), the data transformation can be performed by a single instruction; other data types may require more complex processing, including multiple instructions.

Preferably, the instruction memory I-MEM is initialized when an application APP1-APPz requests to use the data transformer apparatus DT.

The converter module C is configured to execute, on the data to be transformed Data1, the selected one or more transformation instructions INST. Accordingly, the converter module C generates the transformed data Data2.

In particular, the converter module C is configured to execute the selected transformation instructions INST on the data units U provided by the reader module R.

Preferably, the type attribute T provided by the reader module R to the converter module C indicates the position, in the instruction memory I-MEM, of the first instruction to be executed for the data transformation.

Preferably, the operations carried out by the converter module C can include serialization and deserialization.

The converter module C is configured to send the transformed data Data2 to the writer module W.

From a practical point of view, the converter module C can be implemented as a pipeline C' including the following stages: instruction fetch (in order to fetch the transformation instructions INST), decode and register file read (in order to retrieve the data to be transformed Data1 from a register file), execute (in order to execute the fetched instructions on the data to be transformed Data1) and register file writeback (in order to write the result, i.e. the transformed data Data2, back into the register file).

The writer module W is configured to receive the transformed data Data2 from the converter module C.

The writer module W is configured to write the transformed data Data2 in an output buffer according to the second information item X2 received from the dispatcher module D.

In particular, the writer module W is configured to write (by means of its controller W-CTRL) the transformed data Data2 at the appropriate location in the output buffer with a base address and an offset.

The base address is provided by the dispatcher module D (that in turn received it from the core requesting the transformation) and, in practice, is the second information item X2.

The offset, as said above, is calculated by the reader module R and passed along to the writer module W through the converter module C. The writer module W includes internal write buffers that assemble an entire cache line of transformed data Data2 from the converter module C and write them back to the block buffer module BB to be transferred eventually to the on-chip memory hierarchy.

Figure 3:
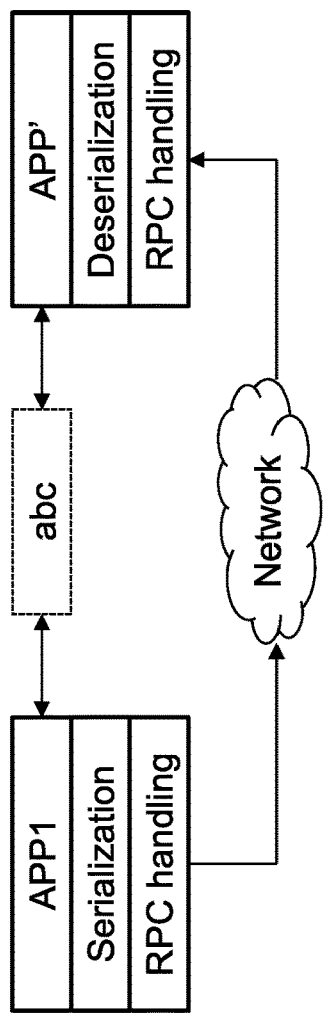
FIG. 3 shows an example software stack where the data transformer apparatus of FIG. 1 can be used.

The writer module W is also configured to notify (through notification N) the dispatcher module D that a request has completed (i.e. that the data transformation has completed). As said above, the dispatcher module D, upon this notification, modifies the validity bit VB associated to such data transformation request DTR in the respective dedicated request control register RCR. The core coupled to this dedicated request control register RCR, which is polling on the corresponding MMIO address, detects that the validity bit VB has been modified (i.e. is cleared) and determines that the transformation is complete. FIG. 3 schematically shows an example software stack wherein data transformer apparatus DT can be used.

Application APP1 performs a Remote Procedure Call (RPC) to application APP' with object "abc" as its argument. APP1 first invokes the code generated by the data transformer apparatus DT framework's compiler to serialize the object into its binary wire representation. Once complete, the buffer containing the binarized object is passed down the stack to the RPC layer. When the RPC arrives at APP', the same procedure is performed in reverse, where the binarized object is deserialized into the format of APP'.

The data transformer apparatus DT can advantageously be employed both for the serialization operation and the deserialization operation.

It is worth noticing that this step takes place for every single network message between microservices, even those using the same data format, as the data must be flattened into a byte-stream.

Regarding deserialization, the Applicant observes that, from a functionality perspective, deserialization is the inverse process of serialization.

An application can request for a deserialization transformation by sending to the data transformer apparatus DT a pointer to the serialized data (which are, in this case, the data to be transformed Data1), and a corresponding schema.

The data transformer apparatus DT as a whole decodes data elements from the serialized format, matches them to the corresponding schema entry, and place the deserialized version in memory with a corresponding pointer in the schema.

Thus, in a deserialization scenario, the reader module R fetches both the serialized data and schema, identifies the correct Chunk and the schema entry and passes them further in the pipeline (i.e. in the Transformation Pipeline). The Converter module transforms the Chunk into the final data element. The writer module W places the data element in a freshly allocated memory region and writes a corresponding pointer to the schema entry.

The invention achieves important advantages.

Firstly, the invention allows performing complex data transformation tasks at high speed. In particular, the Applicant has verified that the claimed data transformer apparatus significantly outperforms commodity CPU cores.

Furthermore, the claimed data transformer apparatus is compatible with existing data representations, thus being usable, for example, by all applications deployed on a server.

In addition to the above, the claimed data transformer apparatus has a minimal impact on the existing server architecture, reducing deployment costs and complexity.

In addition to the above, the invention allows better performances in terms of power consumption—feature which can be conveniently exploited also in mobile devices.

The invention claimed is:

1. Data transformer apparatus comprising at least a dispatcher module (D), a reader module (R), a converter module (C) and a writer module (W), wherein:
   the dispatcher module (D) is configured to:
      receive a data transformation request (DTR) including:
         a first information item (X1) associated to a memory address (ADD) where data to be transformed (Data1) are stored and to a type attribute (T) of said data to be transformed (Data1); a second information item (X2) indicating a memory address where transformed data (Data2), obtained from said data to be transformed (Data1), have to be written;
   the reader module (R) is configured to:
      retrieve the data to be transformed, according to said first information item (X1);
      obtain the type attribute (T) of the data to be transformed (Data1), based on said first information item (X1);
      send the data to be transformed (Data1) and the type attribute (T) thereof to the converter module (C);
   the converter module (C) is configured to:
      select one or more transformation instructions (INST) based on said type attribute (T);
      execute, on the data to be transformed (Data1), the selected one or more transformation instructions (INST), thereby obtaining the transformed data (Data2);
      send the transformed data (Data2) to the writer module (W);
   the writer module (W) is configured to:
      receive the transformed data (Data2) from the converter module (C);
      write the transformed data (Data2) in an output buffer according to said second information item (X2).

2. Data transformer apparatus according to claim 1, wherein said first information item (X1) is a pointer pointing to a memory area, said memory area storing: an address (ADD) wherein the data to be transformed (Data1) are stored, and the type attribute (T) of the data to be transformed (Data1).

3. Data transformer apparatus according to claim 2, wherein said reader module (R) is configured to retrieve the data to be transformed (Data1) based on said pointer.

4. Data transformer apparatus according to claim 1, wherein said dispatcher module (D) is configured to send said first information item (X1) to said reader module (R), and to send said second information item (X2) to said writer module (W).

5. Data transformer apparatus according to claim 1, further comprising a block buffer module (BB), the block buffer module (BB) containing a mapping between a virtual memory system and a physical memory area, the latter storing the data to be transformed (Data1).

6. Data transformer apparatus according to claim 5 wherein said reader module (R) is configured to retrieve the data to be transformed (Data1) from said physical memory area, via said block buffer module (BB).

7. Data transformer apparatus according to claim 6 wherein, in order to retrieve the data to be transformed (Data1), said reader module (R) is configured to:
   send a memory request (MReq) to said block buffer module (BB);
   receive from said block buffer module (BB) a memory response (MResp), representative of a pointer to the memory address (ADD) where the data to be transformed (Data1) are stored;
   send a read request (RReq) to said block buffer module (BB), based on the received pointer;
   receive from said block buffer module (BB) a read response (RResp), including the data to be transformed (Data1).

8. Data transformer apparatus according to claim 7 wherein said reader module (R) comprises:
   a field buffer (FB), wherein said memory response (MResp) is stored;
   a data buffer (DB), wherein said read response (RResp) is stored.

9. Data transformer apparatus according to claim 7, wherein said reader module (R) is configured to send to the block buffer module (BB) a plurality of read requests (RReq) based on the received pointer.

10. Data transformer apparatus according to claim 7, wherein said reader module (R) is configured to select, in said read response (RResp), data units (U) corresponding to said data to be transformed (Data1).

11. Data transformer apparatus according to claim 10, wherein said converter module (C) is configured to execute said one or more selected transformation instructions (INST) on said data units (U).

12. Data transformer apparatus according to claim 1, wherein said dispatcher module (D) is configured to:
- send to said reader module (R) a first information item (X1') of a first data transformation request (DTR');
- send to said reader module (R) a first information item (X1") of a second data transformation request (DTR"), when data transformation associated with said first data transformation request (DTR') is not completed yet.

13. Data transformer apparatus according to claim 1 wherein said dispatcher module (D) comprises:
- one or more dedicated request control registers (RCR), adapted to store data transformation requests (DTR);
- a controller (D-CTRL), configured to:
  - read the data transformation requests (DTR) from said one or more dedicated request control registers (RCR);
  - send the first information item (X1) to the reader module (R);
  - send the second information item (X2) to the writer module (W).

14. Data transformer apparatus according to claim 13, wherein said controller (D-CTRL) is configured to poll on said one or more dedicated request control registers (RCR) to read the data transformation requests (DTR) placed therein.

15. Data transformer apparatus according to claim 13 wherein each of said data transformation requests (DTR) is associated to a validity bit (VB), said validity bit (VB) indicating whether the data transformation request (DTR) is active.

16. Data transformer apparatus according to claim 15, wherein said dispatcher module (D) comprises:
- one or more dedicated request control registers (RCR), adapted to store data transformation requests (DTR);
- a controller (D-CTRL), configured to:
  - read the data transformation requests (DTR) from said one or more dedicated request control registers (RCR);
  - send the first information item (X1) to the reader module (R);
  - send the second information item (X2) to the writer module (W);
  - wherein said controller (D-CTRL) is configured to modify the validity bit (VB) once a corresponding data transformation has been completed, preferably upon notification (N) from the writer module (W).

17. Data transformer apparatus according to claim 15,
- wherein said controller (D-CTRL) is configured to modify the validity bit (VB) once a corresponding data transformation has been completed, preferably upon notification (N) from the writer module (W);
- wherein said controller (D-CTRL) is configured to poll on said one or more dedicated request control registers (RCR) to read the data transformation requests (DTR) placed therein.

18. Data transformer apparatus according to claim 5 wherein said block buffer module (BB) comprises a translation lookaside buffer (TLB), preferably having one entry for each core that is allowed to issue data transformation requests (DTR).

19. Data transformer apparatus according to claim 1, wherein said data to be transformed (Data1) include one or more messages, each message including a plurality of fields, each message being associated to a respective schema, wherein each schema is formed by multiple rows, each row being associated to a respective field of a message, each row of the schema including a memory address (ADD) and a type attribute (T) for the respective field,
- the first information item (X1) including information that allows to retrieve the schema associated with a message included in the data to be transformed (Data1).

20. Data transformer apparatus according to claim 19 wherein the first information item (X1) is a pointer pointing to a memory area wherein the respective schema is stored.

21. Data processing system, comprising an integrated circuit (IC), the integrated circuit (IC) including:
- at least a core (CR1), on which an operating system (OS1) is installed, a software application (APP1) running based on said operating system (OS1);
- a data transformer apparatus (DT) according to claim 1;
- wherein said dispatcher module (D) is in communication with said application (APP1) for receiving said data transformation request (DTR) from said application (APP1).

22. Data processing system according to claim 21, wherein a plurality of cores (CR1-CRx) is included in said integrated circuit (IC), one or more operating systems (OS1-OSy) being installed said cores (CR1-CRx), one or more applications (APP1-APPz) running based on said one or more operating systems (OS1-OSy), wherein each of said cores (CR1-CRx) is associated with a respective input (IN1-INx) of said dispatcher module (D), in particular with a respective request control register (RCR) of said dispatcher module (D).

* * * * *